Dec. 26, 1967 R. A. DAVIS 3,360,090
SILO CHUTE WALL PROTECTOR
Filed Sept. 23, 1966 2 Sheets-Sheet 1
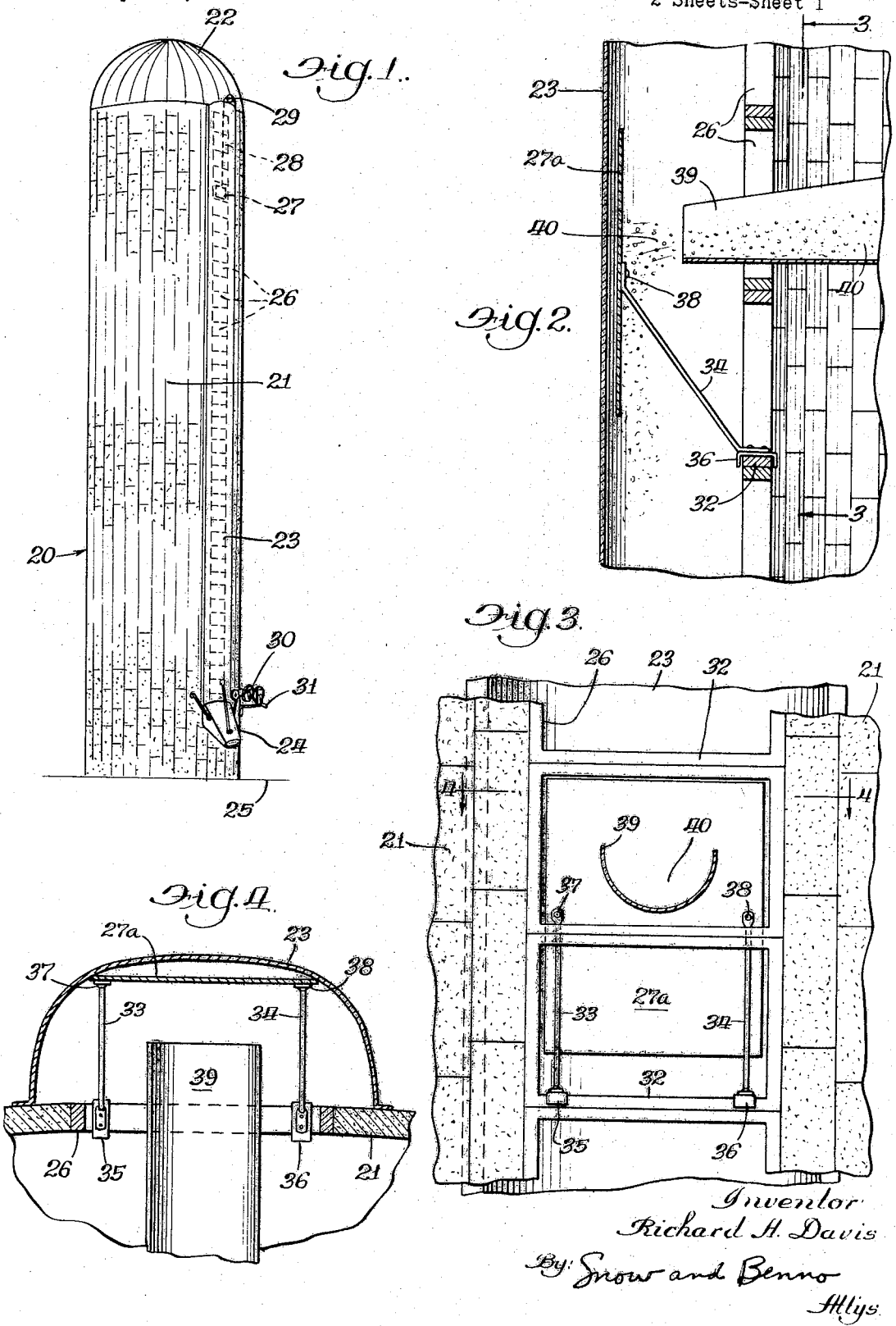
Inventor
Richard A. Davis
By: Snow and Benno
Attys.

Dec. 26, 1967 R. A. DAVIS 3,360,090
SILO CHUTE WALL PROTECTOR
Filed Sept. 23, 1966 2 Sheets-Sheet 2

Inventor:
Richard A. Davis
By Snow and Benno
Attys.

United States Patent Office 3,360,090
Patented Dec. 26, 1967

3,360,090
SILO CHUTE WALL PROTECTOR
Richard A. Davis, Plainfield, Ill., assignor, by mesne assignments, to P & D Mfg. Co., Inc., Plainfield, Ill., a corporation of Delaware
Filed Sept. 23, 1966, Ser. No. 581,599
13 Claims. (Cl. 193—1)

This invention relates to a new and improved Silo Chute Wall Protector.

With the automated livestock feed systems currently in use and in various stages of development, the use of silos is constantly increasing. Whereas in years past the farmer would shovel his silage down from the top of the silo, there are now numerous types and makes of commercial silo unloaders. Most of these unloaders are suspended from the tops of silos and rest on the top surface of the silage to be removed. The principle of the unloader is to scrape the silage loose from the compact mass, to carry a quantity of the scraped silage to a generally centrally disposed area, and then by means of a blower or throwing device to propel the gathered silage laterally to that side of the silo communicating with an outside silo chute. The silo chute is usually in the form of a tube which runs in a straight vertical line from the top to the bottom of the silo and communicates with the interior by removable closures for vertically successive openings in the side wall of the silo. When the silo is being filled the closures are all in place so there is no opening between the interior of the silo and the silo chute. To remove the silage from the silo the upper closures are removed so the silage can be thrown into the chute at or above the level of the top of the silage within the silo. The silage thrown into the chute drops down to the bottom where it is removed for feeding to livestock. The newly developed silo unloaders are being made to remove silage from silos at ever increasing rates of speed. This means that the throwers or blowers used in the silo unloaders discharge the gathered silage at high speeds and thus the silo chute which previously performed only the function of confining the removed silage as the farmer would shovel silage into the chute now must also bear the terrific forces in deflecting the silage which is being propelled at very high speeds against its wall. The combination of the deterioration effects of acidic silage and the propulsion of heavy silage at high rates of speed against the silo chute wall has caused silo chutes to break down and in fact the walls which are constructed of generally light sheet metal have worn through and become so distorted as to be nonuseable without repair or replacement. Manufacturers of silo chutes are now attempting to build their chutes for longer life by increasing the gauge of sheet metal used in their construction and are seeking any way to save the silo chutes from the combined devastating forces of the acidic silage and the abrasion of the highly propelled silage.

It is a principal object of the present invention to provide a novel silo chute wall protector for positioning within the silo chute opposite the discharge of the silage from the silo to thereupon act as a deflector of the silage and thus save the wall of the chute from the silage acids and the continuous battering by the silage being discharged.

An important object of this invention is the provision of a novel vertically adjustable silo chute wall protector.

Another important object of this invention is to provide a novel silo chute wall protector which may be removably attached within the side wall openings of a silo to protect the walls of the silo chute against the corrosive silage acids and the abrasive and damaging effects of the silage being discharged from the silo.

Another and still further important object of this invention is to provide novel silo chute wall protectors of various sizes and shapes in order to save the chute wall from coming in contact with silage acids and from the abrasive and damaging effects of highly propelled silage and to cause a deflection of the silage being transferred from the silo to the vertical stream of silage within the silo chute.

Other and further important objects and advantages of this invention will become apparent from the disclosures in the following specification and accompanying drawings.

In the drawings:

FIGURE 1 is a front elevational view of a silo having a silo chute and including a silo chute wall protector of this invention.

FIGURE 2 is an enlarged detail vertical sectional view of a portion of a silo and silo chute and showing a modified mounting of a silo chute wall portector of this invention in the silo chute and its relation to the discharging silage from the silo.

FIGURE 3 is a sectional view taken on the line 3—3 of FIGURE 2.

FIGURE 4 is a sectional view taken on the line 4—4 of FIGURE 3.

As shown in the drawings:

Figure 5:
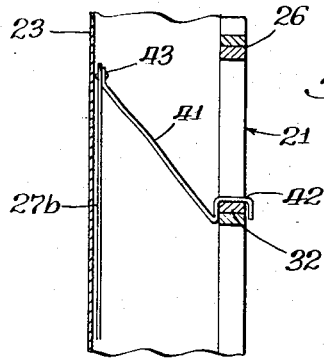
FIGURE 5 shows a modification of the means for attaching the wall protector of this invention to its supporting means.

The reference numeral 20 indicates generally a silo such as used on farms for the storage of ensilage or haylage for the ultimate feeding to livestock. The silo 20 is of the type having a generally cylindrical wall 21 and a dome shaped cap or top 22. The silo is equipped with a vertically disposed chute 23 which is substantially semicircular in shape. The chute is used to enclose and form a passage for the silage or haylage being discharged from the silo 20. The bottom of the chute is provided with a hinged funnel shaped feed confining member arranged and constructed to guide and direct the silage being carried through the chute 23. In the automated feeding equipment now being used by agricultural people the discharge funnel shaped member 24 is preferably spaced above the ground line 25 so that silage may be conveniently deposited in either conveyors or directly to livestock feeders. The side wall 21 of the silo is equipped with a vertical line of spaced openings as defined by the rectangularly shaped frame members 26. These frame members 26 are shown in such a vertical line in FIGURES 1, 2, and 3. Removable closure members (not shown) fill the openings up to the level of the silage within the silo so that silage below the level of that being discharged has no communication with the silo chute. However, at the level of the silage within the silo the closure members have been removed so that the framed openings 26 are free to permit passage of silage from the interior of the silo to the silo chute.

The primary object of this invention as stated above is to provide a silo chute wall protector to receive the direct impact of the silage as it is discharged from the interior of the cylindrical wall 21 and thus protect the wall 23 of the chute against the corrosive effects of silage acids and the abrasive and impact destructive characteristics of silage being propelled at great speeds. The sheet of material termed a protector 27 is preferably located directly opposite the framed opening 26 through which the discharging silage is being propelled. The wall protectors 27 as shown in FIGURES 1 through 8, inclusive, are generally rectangular in shape and may be rigid or non-rigid materials. Many materials such as metal, plastics, fabrics such as canvas, or materials impregnated with other materials such as glass fibers, rubbers, and synthetic rubbers are suitable for use as a wall protector within the scope of this invention. The rectangular wall protector 27 is supported at its top by a cable 28. As best shown in FIGURE 1, the cable 28 extends upwardly from the top of the protector 27 to the top of the silo chute wall 23 where it passes around a pulley 29 fixedly mounted on the top of the silo. From the pulley 29 the cable moves down the outside of the silo chute for engagement with a cable winch 30 fixedly mounted at the lower end of the silo chute. A hand crank 31 is provided on the winch 30 and permits an operator to adjust the vertical positioning of the wall protector 27 within the silo chute. Sufficient cable is carried on the winch 30 to permit lowering of the chute protector 27 within the chute to the bottom thereof throughout the range of discharge of silage from the silo being unloaded.

In the operation of the device of FIGURE 1 it is apparent that the vertical level of the wall protector 27 may be positioned by the operator entirely from his remote station at the position of the cable winch 30. In order to determine the correct positioning of the protector the cable may be marked with various lengths thereon to indicate the position of the protector within the silo chute 23. It is of course imperative to the successful use of this device to have the wall protector lined up with the discharge member of the silo unloader. In the device as depicted in FIGURE 1 the wall protector hangs relatively loosely within the chute but of course is guided on its rear side by the outer wall 23 of the silo chute.

The modified chute protector 27a of FIGURES 2, 3, and 4 distinguishes from the protector 27 as shown in FIGURE 1 by reason of its being firmly held in fixed position opposite the silo opening through which silage is propelled. The mounting of the chute protector 27a within the chute is accomplished by supporting means engaging the sills 32 of the framed silo openings 26. As best shown in FIGURE 4, the supporting means includes parallel brace members 33 and 34 having at their outer ends inverted U-shaped members 35 and 36 for overlapping engagement with the opening sill 32. The braces 33 and 34 hold the wall protector 27a against shifting movement during its bombardment by acidic silage being removed from the silo. The brace members 33 and 34 are generally inclined upwardly and outwardly from their position of engagement with the opening sill whereupon they are fixed at 37 and 38 to the sides of rectangularly shaped wall protector 27a, as shown in all of FIGURES 2, 3, and 4.

As shown in FIGURES 2, 3, and 4 a silo unloader discharge member 39 projects through one of the openings 26 and silage 40 is shown being propelled against the chute wall protector 27a whereby the silage is deflected by the member 27a downwardly for delivery through the chute passage and at the same time protecting the outer wall 23 of the chute from the direct impact of the silage 40.

In the operation of the device of FIGURES 2, 3, and 4 it is apparent that the wall protector 27a must be manually inserted within the chute and mounted on the desired sill 32 of the opening immediately below that opening where the silage discharge is occuring. This is clearly shown in FIGURES 2 and 3. The wall protector 27a is thus substantially rigidly placed within the silo chute immediately opposite the discharging silage so that it receives on its face the silage being impelled thereagainst. As shown in FIGURE 4 the back side of the wall protector 27a is located very close to the inside of the chute wall 23 so that it does have some support in its placement by reason of its abutting the inner side of the chute wall 23. As the silage 40 strikes the chute protector device 27a it is caused to be deflected downwardly through the chute 23 and thus through the discharging member 24 at the bottom of the chute. The chute protector thus takes the brunt of the corrosive and abrasive wear which ordinarily would be directed to the inside wall of the chute 23. This saves the all from being corroded and abraided and unduly worn and prevents the almost certain necessity of replacement or at least repair after very short periods of use if the protector were not used. As silage is removed from the silo the silo unloader moves downwardly within the silo so that its discharge spout 39 must be moved downwardly for extension through one of the other framed openings 26 therebeneath. The chute protector 27a must also be lowered so that the discharging silage strikes the protector device instead of the inside wall of the silo chute. Movement of the wall protector 27a is accomplished by vertically lifting the device to cause its inverted U-shaped members 36 to be disengaged from the sill 32 of the opening 26 and thereupon permit its downward movement for engagement with a sill of one of the lower openings. Conversely when the silo is again filled the protector 27a would be raised to a height commensurate with the top level of the silage.

The series of figures in the drawings from 5 through 12 show further modified forms of the invention. In the modification of FIGURE 5 the device is substantially similar to that of FIGURES 2, 3, and 4. Here the wall protector 27b has its supporting structure shown as an angular brace or arm member 41 with an inverted U-shaped clamp member 42 which telescopically engages the sill 32 of one of the framed openings 26. However, rather than having the brace 41 support the protector wall 27b from a central position the brace members fasten at 43 to the top of the member 27b thereby hanging the entire wall protector from the top support. As stated above, the silo chute protector devices 27 of this invention may utilize metal, plastics, fabrics, or any suitable material such as canvas in the assumption of the impact of the silage as it is removed from the silo. With the use of fabrics such as a heavy canvas it is desirable to support the wall protector member at its top. Such a mounting is depicted in this modified version of the invention in FIGURE 5.

Figure 6:
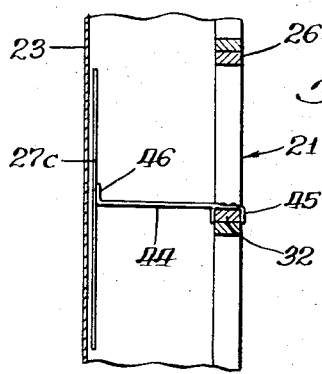
FIGURE 6 is another modification of the invention and shows a still further means of attaching the wall protector to its supporting means.

FIGURE 6 is also similar to the device of FIGURES 2, 3, and 4 but for the fact that the brace or support members are generally horizontally disposed rather than inclined. In FIGURE 6 the silo chute protector device is identified by the numeral 27c and the brace support members are shown at 44. These support members 44 are horizontally disposed and have inverted U-shaped members 45 engaging the sill of an opening 26 at their inner sides and engage a generally central portion of the protector as shown at 46 on their outer ends.

Figure 7:
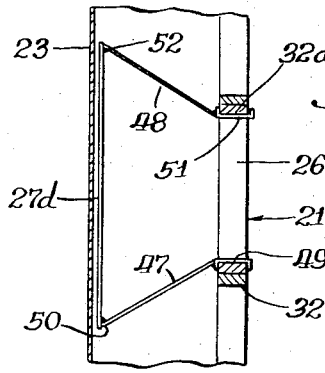
FIGURE 7 is a modification of the invention showing another form of removable attaching means for engaging the side openings of a silo.

FIGURE 7 shows a still further modified form of the invention with a silo chute protector wall 27d positioned opposite of the silo discharge openings 26. In this instance the protector device is supported by vertically spaced apart braces 47 and 48. The lower brace member 47 is provided with an inverted U-shaped clamp 49 for engaging the lower sill of one of the framed openings 26. The brace 47 is inclined downwardly and outwardly and is fastened at 50 to the lower edge of the protector 27d. The upper brace member 48 is provided with a U-shaped clamping member 51 which engages an upper frame member 32a of the framed opening 26. The brace 48 extends upwardly and outwardly for fastening at 52 to the upper edge of the wall protector 27d of this modified form of the invention. It is apparent that with this construction the wall protector may be either of the rigid or nonrigid type and yet will be properly supported within the silo chute opposite the stream of discharging silage to thereby protect the regular wall of a silo chute.

Figure 8:
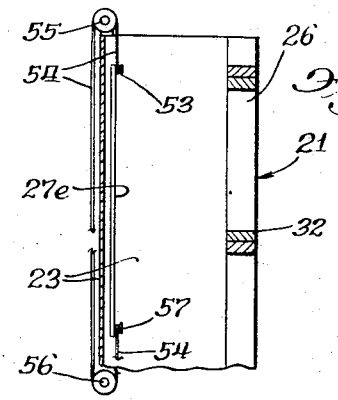
FIGURE 8 shows a modification of the means for vertically moving the wall protector within the silo chute.

In the modified form of the invention as shown in FIGURE 8 the wall protector is identified by the numeral 27e. The protector 27e is supported within the chute in substantially the same manner as that shown in FIGURE 1. The upper edge of the member 27e is provided with a fastening means 53 to which a cable 54 is attached. The cable projects upwardly from its attachment to the protector and thence around a generally fixed position pulley 55. The cable 54 then passes down outside the silo chute 23 to a location at the bottom where it thence passes around a generally fixed position pulley 56. The cable then extends upwardly for attachment at 57 to the lower edge of the wall protector 27e. With this construction the cable and including the wall protector device 27e there is a continuous pulley member such that as the cable 54 is moved over its vertically spaced apart and aligned pulleys 55 and 56 an operator may effectively position the wall protector 27e opposite any desired opening 26 of the silo and thereby protect the inner wall of the chute against the corrosive and abrasive damage caused by continuous beating of the silage against the chute wall during this discharge.

Figure 9:
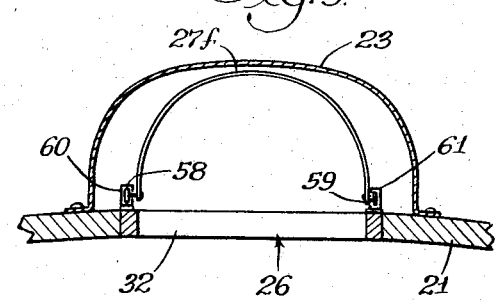
FIGURE 9 shows a modified shape of silo chute wall protector as used in this invention and including a modified form of vertical positioning within the silo chute.

The modification of the invention as shown in FIGURE 9 utilizes a substantially semi cylindrical shaped wall protector identified by the numeral 27f. One forward edge of the wall protector 27f is provided with a small guide wheel 58. Similarly the other forward edge of the protector is provided with a small guide wheel 59. The wheels are preferably axially aligned and are adapted to respectively ride in vertically disposed track members 60 and 61 which are provided within the silo chute and fastened to the outside wall of the silo at the position of and flanking the sides of the framed openings 26. In this arrangement the wall protector 27f receives the impact of the silage being removed from the silo and may be vertically disposed within the silo chute by reason of the raising and lowering thereof by the cooperative wheel and track elements on the forward inner edges of the wall protector. Such a protector may be either raised and lowered within the chute by cable or pulley means such as shown in FIGURES 1 and 8 or may be held in a desired vertical position by any one of the brace supporting members as shown in FIGURES 2 through 7, inclusive.

Figure 10:
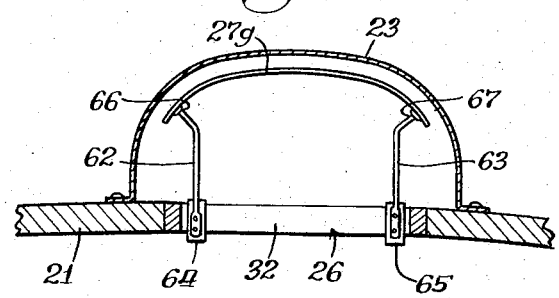
FIGURE 10 shows a still further modified shape of wall protector of this invention.

In the modification of FIGURE 10 the wall protector is of a curved shape and is identified by the numeral 27g. The curved plate 27g is supported by brace arms 62 and 63. The inner end of the brace arm 62 is provided with an inverted U-shaped member 64 for engaging the sill 32 of the framed opening 26 and similarly the inner end of the brace member 63 is provided with a comparable inverted U-shaped member 65 and engages the same sill 32 at a laterally spaced apart position. The outer end of the brace 62 is fastened at 66 to one lateral side edge of the curved wall protector 27g while the other brace 63 is fastened at 67 to the other lateral side edge of the curved wall protector 27g. Here again there is provided a manually shiftable wall protector within a silo chute to assume the impact of silage being removed from a silo.

Figure 11:
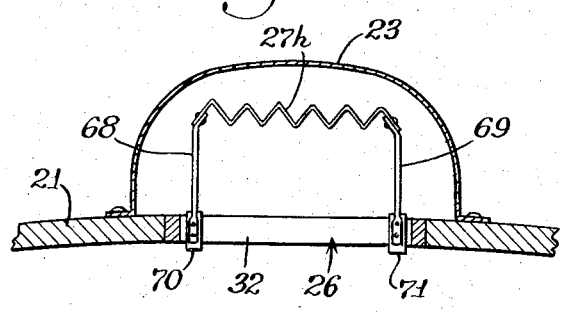
FIGURE 11 shows a still further modified shape of the silo chute wall protector of this invention.

In the modification of the invetnion as shown in FIGURE 11 there is provided a corrugated or accordian shaped wall protector 27h. The lateral side extensions of the wall protector 27h are carried by side braces 68 and 69. The inner ends of the brace members are provided with inverted U-shaped clamp members 70 and 71 respectively which engage a sill 32 of one of the silo chute framed openings 26. The corrugated shape of the protector acts to receive the discharging silage with a minimum of reflective bounce and thereby tends to more positively confine the silage being removed to the path of the vertical silo chute.

Figure 12:
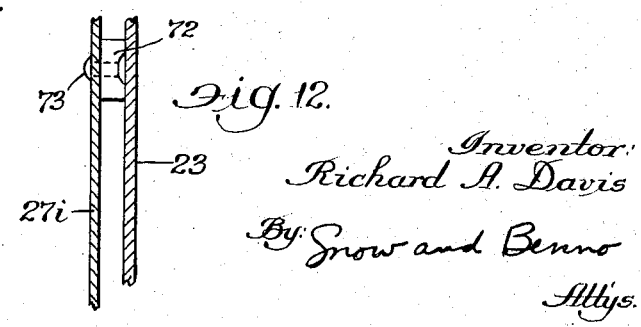
FIGURE 12 is a sectional detail of a modified form of attaching means for holding the protector to the silo chute.

FIGURE 12 shows a modified means for supporting or carrying the wall protector within the silo discharge chute. Here the wall protector device is identified as 27i and may be any one of the materials herein discussed for the other protectors whether it be a rigid material or a nonrigid material. Magnetic buttons 72 are fastened, such as by rivets 73, to strategic positions on the protector 27i. The magnets 72 are attracted to the sheet steel chute 23 and thereby act to hold the protector 27i in any desired position within the chute. This invention thus contemplates the use of magnetic means for removably fastening the various forms of protectors within the silo chute.

The operations of all of the modified forms of the invention disclosed herein are primarily the same in that the wall protectors are positioned generally vertically as desired so that they are opposite the path of discharging silage. This acts to protect and guarantee the long service of the silo chute without necessary repair or replacement. The various shapes of the chute protector and supports for the chute protector perform differently with different livestock feed materials. In certain silage or haylage the generally flat protector wall is effective, whereas in other materials the arcuate or curved walls of the modified deflectors of FIGURES 9 and 10 might be more desirable and/or the corrugated construction of the modified device of FIGURE 11 might be more suitable. Further, the rigidity of the protector might play an important part in the effective operation of the deflector. In experimental operation the deadening effect of the fabric, such as canvas, might be more suitable under some circumstances than the rigid protector made of metal or stiff plastics materials. The present invention contemplates a wall protector capable of vertical adjustment within a silo chute made of either rigid or nonrigid material supported in any desired manner within the chute and having any shape to receive the discharging silage.

I am aware that many details of construction may be varied throughout a wide range without departing from the principles disclosed herein and I therefore do not propose limiting the patent granted hereon otherwise than as necessitated by the appended claims.

What is claimed is:

1. A wall protection for a vertically extending silo chute comprising a sheet of material for vertical disposition adjacent the inside of the wall of the silo chute opposite the opening into a silo through which silage is discharged, and means for adjustably supporting the sheet of material in a desired vertical position within the silo chute.

2. A device as set forth in claim 1 in which the means for adjustably supporting the sheet of material comprises a pulley at the top of the chute, a cable attached to the top of the sheet of material, and the cable extending up to the top of the silo chute and over the pulley and thence downwardly to a position adjacent the bottom of the silo chute.

3. A device as set forth in claim 2 in which said means further includes a cable winch at the bottom of the chute and said cable fastened to said cable winch for effecting a raising or lowering of said sheet of material.

4. A device as set forth in claim 2 in which said means further includes a pulley at the bottom of said chute, and said cable extending around said pulley and thence upwardly for fastening to the bottom of said sheet of material.

5. A device as set forth in claim 1 in which said means for adjustably supporting the sheet of material comprises brace members fastened to said sheet of material and removably clamping to the opening walls of the silo.

6. A device as set forth in claim 1 in which said sheet of material comprises a generally rigid material.

7. A device as set forth in claim 1 in which said sheet of material comprises a generally nonrigid material.

8. A device as set forth in claim 1 in which said sheet of material comprises a semicylindrical shape.

9. A device as set forth in claim 1 in which said sheet of material comprises a curved shape.

10. A device as set forth in claim 1 in which said sheet of material comprises an accordion shape.

11. A device as set forth in claim 1 in which said means for adjustably supporting the sheet of material further includes cooperative track and roller means.

12. A device as set forth in claim 1 in which said means for adjustably supporting the sheet of material includes inverted U shaped clamp members carried on said sheet of material, said silo openings having sills, and said inverted U shaped clamp members engaging and supported on the sills of said silo openings.

13. A device as set forth in claim 1 in which said means for adjustably supporting the sheet of material includes magnets attached to said sheet of material for cooperative engagement to the inside wall of the silo chute.

References Cited
UNITED STATES PATENTS

| | | | |
|---|---|---|---|
| 1,211,310 | 1/1917 | Griffin | 302—59 |
| 1,275,015 | 8/1918 | Girtanner et al. | 302—59 |

ANDRES H. NIELSEN, *Primary Examiner.*